United States Patent
Eskildsen et al.

(10) Patent No.: US 9,582,987 B2
(45) Date of Patent: Feb. 28, 2017

(54) SELF-CONTAINED, BUOYANT, AND WATER-TIGHT WIRELESS FLOOD DETECTOR

(71) Applicant: HONEYWELL INTERNATIONAL INC., Morristown, NJ (US)

(72) Inventors: Kenneth G. Eskildsen, Great Neck, NY (US); Robert E. Lee, Garden City, NY (US); Kevin G. Piel, Ronkonkoma, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 59 days.

(21) Appl. No.: 13/913,934

(22) Filed: Jun. 10, 2013

(65) Prior Publication Data

US 2014/0361887 A1   Dec. 11, 2014

(51) Int. Cl.
| | |
|---|---|
| *G08B 1/00* | (2006.01) |
| *G08B 21/00* | (2006.01) |
| *G08B 25/10* | (2006.01) |
| *G01F 23/64* | (2006.01) |
| *G01F 23/76* | (2006.01) |
| *G01F 23/00* | (2006.01) |
| *G08B 21/20* | (2006.01) |

(52) U.S. Cl.
CPC ......... *G08B 25/10* (2013.01); *G01F 23/0007* (2013.01); *G01F 23/0023* (2013.01); *G01F 23/64* (2013.01); *G01F 23/76* (2013.01); *G08B 21/20* (2013.01)

(58) Field of Classification Search
CPC ..... A47L 15/4297; G01F 23/64; B63G 8/001; B63B 22/20; G01C 13/00; G08B 21/088; G08B 21/084

USPC ...... 340/870.01, 539.1, 539.17, 539.26, 618, 340/539.11, 985, 603, 815.4, 573.6, 584, 340/624, 605; 73/313, 170.29, 61.51, 73/61.46, 53.01

See application file for complete search history.

(56) References Cited

U.S. PATENT DOCUMENTS

| | | | | |
|---|---|---|---|---|
| 3,603,952 | A | * | 9/1971 | Smith ................. 340/539.26 |
| 3,719,936 | A | * | 3/1973 | Daniels et al. .............. 441/1 |
| 3,885,418 | A | * | 5/1975 | Kriebel .................. 73/61.51 |
| 4,116,045 | A | * | 9/1978 | Potter ................... 73/61.46 |
| 4,264,902 | A | | 4/1981 | Miller |
| 4,631,956 | A | * | 12/1986 | Walden et al. ........ 73/170.29 |
| 4,644,328 | A | | 2/1987 | Szymansky et al. |
| 4,771,272 | A | * | 9/1988 | Barnes ..................... 340/624 |

(Continued)

FOREIGN PATENT DOCUMENTS

CN   101774421 A   7/2010

OTHER PUBLICATIONS

Extended European search report for corresponding European patent application 14169544.5, dated Oct. 30, 2014.

(Continued)

*Primary Examiner* — Hoi Lau
(74) *Attorney, Agent, or Firm* — Husch Blackwell LLP

(57) ABSTRACT

A floatable flood detector has a watertight housing that carries internally a wireless transmitter and a fluid sensor. In the presence of sensed fluid, an alarm message can be transmitted by the transmitter to a displaced monitoring unit. The sensor has a portion exposed to the fluid of interest outside of the housing. The antenna is carried, at least at a fluid level, relative to the floating housing.

12 Claims, 5 Drawing Sheets

(56) References Cited

U.S. PATENT DOCUMENTS

| | | | | |
|---|---|---|---|---|
| 4,778,957 | A * | 10/1988 | Crowell | 200/84 R |
| 4,973,947 | A * | 11/1990 | Tax | G08B 21/084 200/61.04 |
| 5,517,202 | A * | 5/1996 | Patel et al. | 343/709 |
| 5,532,679 | A * | 7/1996 | Baxter, Jr. | 340/539.26 |
| 5,621,390 | A * | 4/1997 | Neal | 340/584 |
| 5,654,692 | A * | 8/1997 | Baxter et al. | 340/539.17 |
| 5,767,775 | A | 6/1998 | Shukla et al. | |
| 6,008,728 | A * | 12/1999 | Wesey | 340/618 |
| 6,025,788 | A * | 2/2000 | Diduck | G01M 3/18 340/3.4 |
| 6,583,724 | B1 * | 6/2003 | Rodriguez | 340/573.6 |
| 6,711,949 | B1 * | 3/2004 | Sorenson | 73/313 |
| 6,910,498 | B2 * | 6/2005 | Cazden | 137/392 |
| 7,471,206 | B1 * | 12/2008 | Ellerman | 340/603 |
| 8,508,382 | B1 * | 8/2013 | Novak | 340/815.4 |
| 2003/0068936 | A1 * | 4/2003 | Yerazunis et al. | 441/11 |
| 2003/0227394 | A1 * | 12/2003 | Rothgeb et al. | 340/870.01 |
| 2004/0004545 | A1 * | 1/2004 | Early | 340/539.26 |
| 2004/0004550 | A1 * | 1/2004 | Early | 340/603 |
| 2004/0004551 | A1 * | 1/2004 | Early | G01F 23/76 340/603 |
| 2004/0056779 | A1 * | 3/2004 | Rast | 340/985 |
| 2005/0084418 | A1 * | 4/2005 | Hill et al. | 422/58 |
| 2006/0292043 | A1 * | 12/2006 | Biberger | 422/100 |
| 2008/0087209 | A1 * | 4/2008 | Yoshida et al. | 114/333 |
| 2008/0150733 | A1 * | 6/2008 | Snyder | G08B 21/088 340/573.6 |
| 2009/0107386 | A1 * | 4/2009 | Sampson et al. | 114/261 |
| 2009/0224930 | A1 * | 9/2009 | Burza | G01F 23/68 340/618 |
| 2009/0295566 | A1 * | 12/2009 | Weintraub | 340/539.11 |
| 2011/0012728 | A1 * | 1/2011 | McCane et al. | 340/539.1 |
| 2011/0073707 | A1 * | 3/2011 | Bossert et al. | 244/63 |
| 2011/0108370 | A1 * | 5/2011 | Therriault | B66B 5/0006 187/393 |
| 2011/0155546 | A1 * | 6/2011 | Ford | G08B 21/088 200/61.05 |
| 2012/0275265 | A1 * | 11/2012 | Nielsen et al. | 367/20 |
| 2014/0266745 | A1 * | 9/2014 | Middleton | 340/618 |
| 2014/0361887 | A1 * | 12/2014 | Eskildsen et al. | 340/539.1 |

OTHER PUBLICATIONS

English-language translation of abstract for patent publication CN 101774421 A, dated Jul. 14, 2010.
First Office Action with Search Report for corresponding CN patent application 201410317170.2, dated Feb. 2, 2016.
English-language translation of First Office Action with Search Report for corresponding CN patent application 201410317170.2, dated Feb. 2, 2016.

* cited by examiner

SELF-CONTAINED, BUOYANT, AND WATER-TIGHT WIRELESS FLOOD DETECTOR

FIELD

The application pertains to fluid detectors to provide indicators of flooding in regions of interest. More particularly, the application pertains to such detectors that are self-contained and can wirelessly communicate with systems monitoring various conditions in a region of interest.

BACKGROUND

Systems are known to monitor regions of interest for the presence of various predetermined conditions. These include intrusion, glass breakage, smoke, fire, humidity, and temperature, all without limitation. At times, it is desirable to monitor a region for the presence of fluids, for example, flood water.

Known types of flood detectors have one or two part designs. The one part designs are not buoyant and are designed to be submersible should the flood water rise higher than the sensor. As a result, such products are usually not wireless since the wireless performance would be quite poor when submerged.

An exemplary two part product that exists in the wireless market place includes a probe and a separate transmitter with a wire between the probe and the transmitter. Installation of this type of product involves attaching the probe with screws in the area to be monitored. Then, the transmitter is mounted a distance away from the probe, and a wire is routed between the probe and transmitter. The transmitter is mounted away from the probe to protect it from the water and ensure that the probe does not become submerged, rendering it inoperable.

The above process is time consuming. It may take as much time as an installer may have for installation of an entire monitoring system. Further, this type of product is not something that can be mailed to a home owner for self-installation.

It would be desirable to have available a wireless flood detector that can be easily installed without a need for special installation skills or instructions.

DETAILED DESCRIPTION

Figure 1:
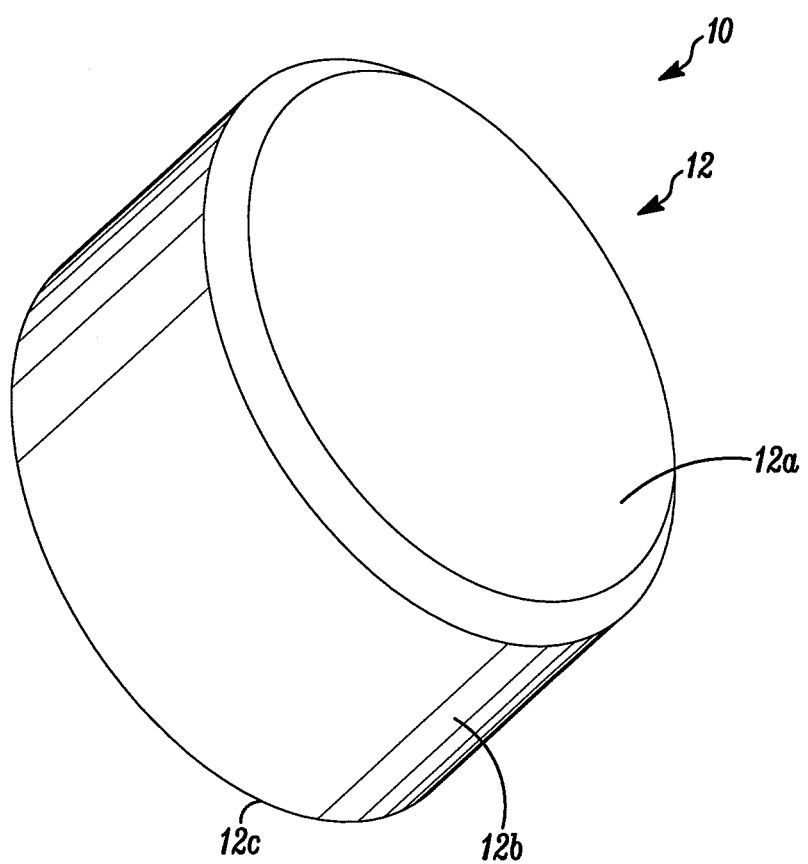
FIG. 1 illustrates a flood detector in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or claims to the specific embodiment illustrated.

In a disclosed embodiment, a wireless flood detector is configured with a single housing. The fluid or flood probes or electrodes are molded into the housing on the top, the bottom, or both. The detector is buoyant so as to keep the electronics (radio, antenna, etc.) above water and operational. Installation is as easy as placing it in the area to monitor for flooding. Advantageously, in the disclosed detector, the sensor, radio, and flood probes are mounted in a single, watertight, buoyant housing.

The housing is preferably made of a buoyant material, for example, plastic with an air pocket (or foam). Molded into this housing are two fluid sensing electrodes on one or both sides that could contact the area to be monitored.

The preferred embodiment has a puck-like shape. Two electrodes can be located on the top of the puck, and two electrodes can be located on the bottom of the puck. It will be understood that other housing shapes come within the spirit and scope hereof. For example, a spherical housing could be used.

Inside the puck resides control circuits and a wireless transmitter. In one embodiment, a Honeywell model 5816 transmitter could be used. The control circuits can be connected to the electrodes. An antenna, coupled to the transmitter, is mounted in the center of the puck such that it will be above water regardless of the orientation of the puck relative to the fluid, such as water.

When the electrodes on either side of the puck are submerged in water, the presence of the water can be detected. A message can be wirelessly transmitted to a displaced control panel.

To install such detectors, an installer would first enroll the flood puck's serial number into the control panel by either submerging the detector in water or by shorting the two electrodes with a wire or screwdriver. Once enrolled, the installer would identify an area for flood monitoring and place the flood puck in that area. When there is a flood, the electrodes will be submerged in the water and send an alarm indicating signal to the control panel. Should the water rise, the flood puck will float on the water, keeping the electronics dry and the antenna above the water, ensuring continued operation.

The figures illustrate various aspects of embodiments hereof. A fluid detector 10 includes a cylindrical, puck-shaped housing 12 having an upper surface 12a, a closed bounding sidewall 12b, and a lower surface 12c. The housing 12 is closed and watertight.

Figure 3:
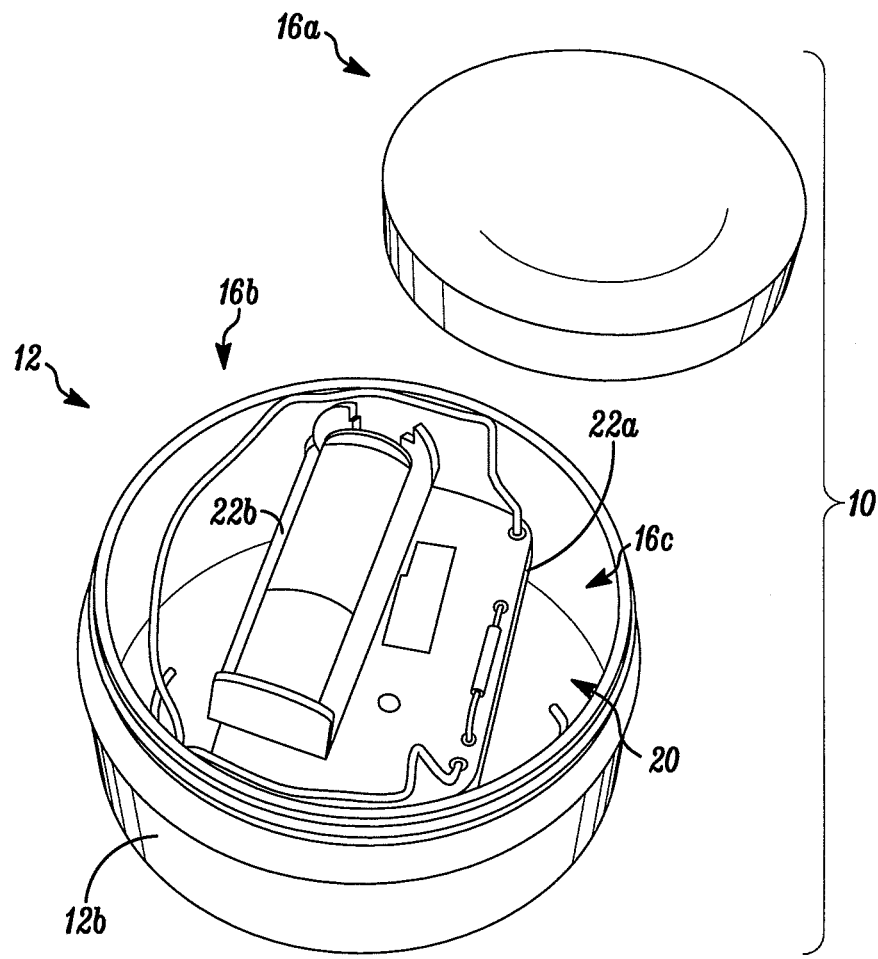
FIG. 3 is an over-all view of the detector of FIG. 1 with the cover removed.

As illustrated in FIG. 3, the housing 12 includes a removable cover 16a and a base portion 16b, which defines an interior region 16c. When the cover 16a is removably attached to the base 16b, for example, by threads or a snap fit, a closed dry interior region is formed, which includes the interior region 16c. It will be understood that other shapes of a housing could be used as well as other structures to attach the cover 16a to the base 16b without departing from the spirit and scope hereof.

Figure 4:
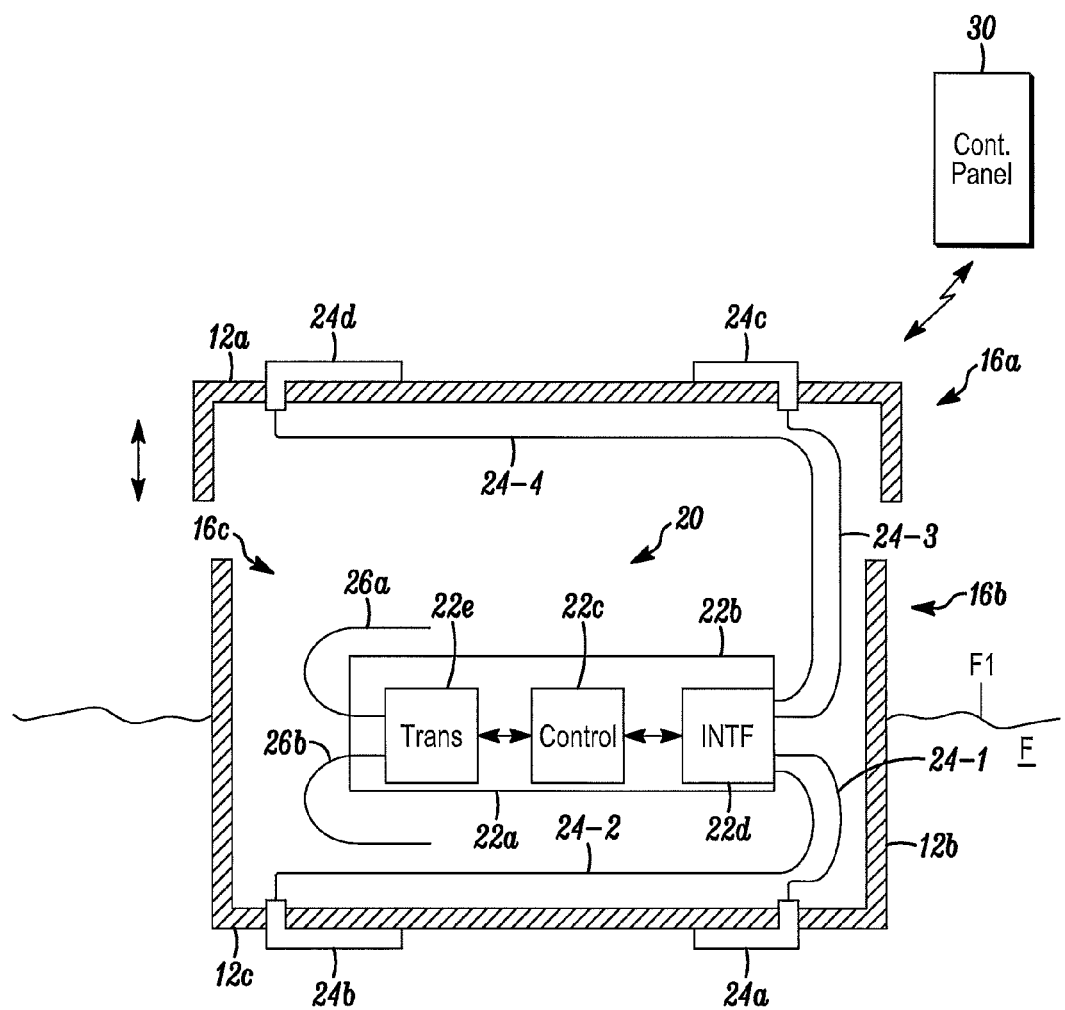
FIG. 4 is a side sectional view of a detector as in FIG. 1 and FIG. 3.

The housing 12 can carry an electronics package 20, which includes a printed circuit board 22a. The board 22a supports a replaceable battery 22b, which provides electrical energy for control circuits 22c, sensor interface circuits 22d, and a transmitter or a transceiver 22e, best seen in FIG. 4.

Figure 2:
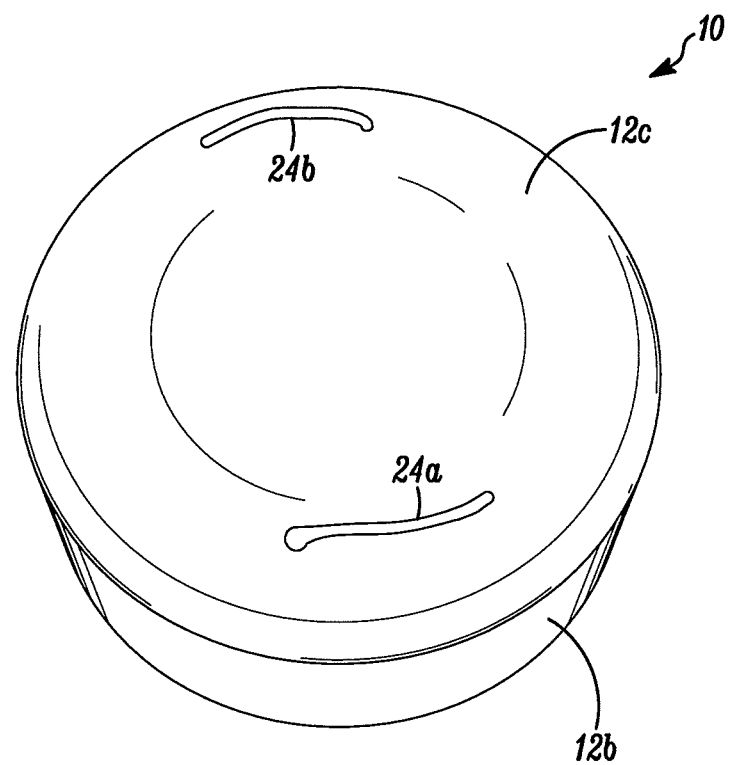
FIG. 2 is a bottom view of the detector of FIG. 1.

Electrodes or sensors 24a, b can be carried on a surface 12c outside of the housing 12 for exposure to local fluids F, as illustrated in FIG. 2. The electrodes 24a,b could be molded into the lower portion 16b of the housing 12 and connected to the sensor interface circuitry 22d in the region 16c via sealed, fluid excluding ports in the surface 12c and conductors 24-1, -2.

A second set of electrodes 24c, d can be formed in an upper surface 12a of the housing 12, also coupled to the sensor circuits 22d by conductors 24-3, -4. Those of skill will understand that neither the exact type of fluid sensors used nor the structure of the conductors to the interface circuits 22d represent limitations hereof.

First and second antenna sections 26a, b are carried on/by the printed circuit board 22a and are coupled to the transceiver 22e. The antennas 26a,b are configured such that one of them is always above a fluid level surface F1 when the detector 10 is floating in the fluid F to facilitate wireless communications with a displaced monitoring control unit or panel 30.

Figure 5:
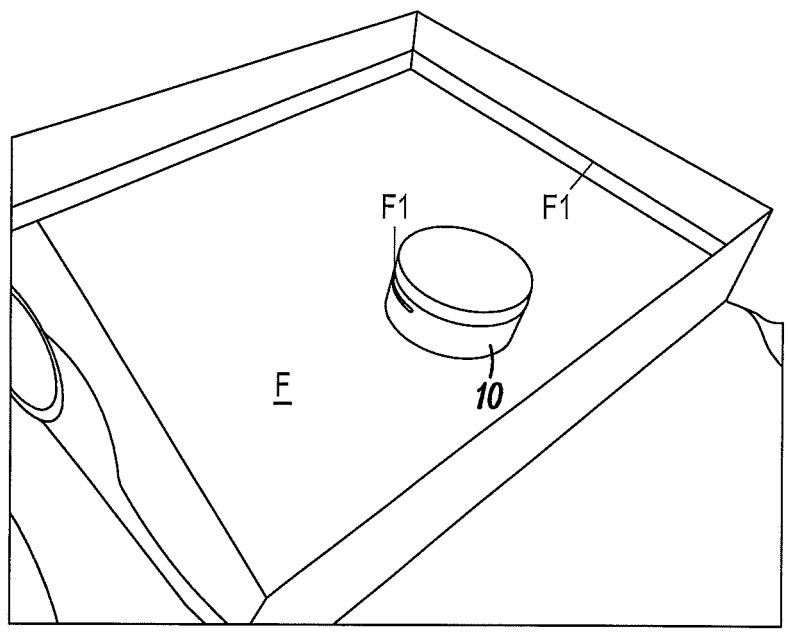
FIG. 5 illustrates the detector hereof floating in a fluid.

FIG. 5 illustrates the detector 10 floating in a fluid F. Advantageously, when both surfaces 12a and 12c carry fluid sensors, such as 24a . . . c, the orientation of the detector 10 in the fluid F is irrelevant given the above-noted antenna configuration. Hence, the installer merely needs to place the detector 10 into the region where the fluid might collect without being concerned as to its orientation.

In summary, a flood detector includes a floatable, self-contained housing that carries external fluid sensors. Control circuitry, coupled to the sensors, and a transmitter can be carried in the housing. The detector can communicate wirelessly with a displaced monitoring system control unit or panel.

An antenna is carried in the housing, coupled to the transmitter. When the housing floats in the fluid, a portion of the housing is below the upper surface of the fluid, and a portion is above that upper surface. The housing is configured such that the antenna is above the upper surface of the fluid to improve wireless communications with the displaced control panel while the detector is floating in the fluid.

Further, it will be understood that the type of fluid being sensed is not a limitation hereof. The relative location of the antenna to the surface of the fluid is preferably at the top of the fluid to minimize RF attenuation. Finally, the housing needs only to be fluid resistant long enough to send a transmission indicating that fluid has been sensed.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. A detector comprising:
a water-tight, floatable, self-contained housing that carries external electrodes molded into the water-tight, floatable, self-contained housing that are configured to detect a change in an environment from dry to wet in an area adjacent to the external electrodes,
wherein the external electrodes are coupled to sensor interface circuits coupled to control circuits coupled to a wireless transmitter coupled to an internal antenna for communicating wirelessly with a displaced monitoring unit,
wherein the internal antenna is configured to be above an upper surface of an external fluid in contact with the external electrodes, and
wherein an alarm signal is generated to indicate the change in the environment from dry to wet in the area adjacent to the external electrodes.

2. The detector as in claim 1 wherein the water-tight, floatable, self-contained housing has a sealed continuously extending external periphery.

3. The detector as in claim 1 wherein the water-tight, floatable, self-contained housing has a base and a removable top that engages the base with a water resistant seal.

4. The detector as in claim 1 wherein the external electrodes are located on either one side of the water-tight, floatable, self-contained housing or on two spaced apart sides of the water-right, floatable, self-contained housing.

5. The detector as in claim 1 wherein the water-tight, floatable, self-contained housing comprises a plastic material.

6. The detector as in claim 1 further comprising a replaceable battery in the water-tight, floatable, self-contained housing that energizes at least the sensor interface circuits or the control circuits.

7. A flood detector comprising:
a floatable water resistant housing that carries internally a wireless transmitter connected to an antenna and to control circuits, sensor interface circuits connected to the control circuits, and at least one electrode connected to the sensor interface circuits,
wherein the at least one electrode is molded into the floatable water resistant housing and configured to detect a change in an environment from dry to wet in an area adjacent to the at least one electrode,
wherein an alarm message is transmitted by the wireless transmitter, via the antenna, to a displaced monitoring unit when the change in the environment from dry to wet in the area adjacent to the at least one electrode is immediately detected by the at least one electrode, and
wherein the antenna is configured to be above an upper surface of an external fluid in contact with the flood detector.

8. A method for detecting a flood comprising:
placing a self-contained, floatable fluid detector at a location, wherein the self-contained, floatable fluid detector comprises an antenna connected to a transmitter that is connected to control circuits that are connected to sensor interface circuits that are connected to an electrode on a surface of the self-contained, floatable fluid detector;
sensing a presence of an external fluid adjacent to the self-contained, floatable fluid detector by the electrode;
generating signals by the electrode in response to the external fluid being sensed;
processing the signals; and
wirelessly transmitting, via the transmitter and the antenna, a selected message to a displaced location,
wherein the antenna is configured to be above an upper surface of the external fluid being detected.

9. The method as in claim 8 further comprising providing a monitoring system control unit displaced from the self-contained, floatable fluid detector and receiving the selected message thereat.

10. The method as in claim 9 further comprising establishing, at the monitoring system control unit, if the selected message indicates a sensed flood condition.

11. The method as in claim 8 further comprising transmitting at least one of a plurality of messages, wherein the at least one of the plurality of messages is indicative of a flood condition.

12. The method as in claim 11 wherein the at least one of the plurality of messages provides detector status information.

* * * * *